Dec. 6, 1960  S. C. ALLEN  2,963,375
PRESERVATION OF FOODS
Filed Jan. 13, 1960

INVENTOR.
SIMEON CARLYLE ALLEN
BY
ATTORNEY

United States Patent Office 2,963,375
Patented Dec. 6, 1960

2,963,375

PRESERVATION OF FOODS

Simeon Carlyle Allen, 615 Commonwealth Ave.,
Newton 59, Mass.

Filed Jan. 13, 1960, Ser. No. 2,305

4 Claims. (Cl. 99—171)

This invention relates to the preservation of foods, and more particularly to the sterile preservation of foods without use of hermetic sealing.

This application is in part a continuation of my copending application, Serial No. 802,525, filed March 27, 1959, which application, in turn, is in part a continuation of my earlier copending application, Serial No. 606,576, filed August 28, 1956 (now abandoned).

A principal object of this invention is to provide a simple and economical method of preserving, in sterile condition, foods which are subject to attack by bacteria, and to provide packaged, sterile foods which remain sterile without hermetic sealing.

Other objects of this invention will in part be obvious and will in part appear hereinafter.

The invention accordingly comprises the product possessing the features, properties and relation of components, and the process involving the several steps and the relation and order of one or more of such steps with respect to each of the others, which are exemplified in the following detailed disclosure, and the scope of the application of which will be indicated in the claims.

For a fuller understanding of the nature and objects of the invention, reference should be had to the following detailed description taken in connection with the accompanying drawing wherein.

A number of ways of preserving foods have been proposed, including drying, addition of preservatives, refrigeration, freezing and sterilization. Of these processes, only sterilization contemplates the destruction of bacteria which otherwise might render the food unusable. The other preservation procedures contemplate protecting the food by inhibiting the ability of the bacteria to act upon the food or by providing conditions under which bacterial action is not favored. For sterilization to be effective, it has been necessary to exclude subsequent introduction of outside bacteria. Thus, the sterilized foods were protected from later access by bacteria by the use of hermetic sealing, e.g., as practiced in canning (in metal, glass, plastic, etc.). Sealing of foods from outside air is customary in other forms of preservation also.

I have discovered that sterile foods may be kept sterile without hermetic sealing by the use of "bacteria baffle wrapping," i.e., a wrapping which includes bacterial baffles. The food within the package is so wrapped that the wrapping provides one or more narrow passages in open communication with the atmosphere, and wherein said passage contains at least two bacterial baffles, e.g., folds, bends or other angular turns or changes in direction in the passage, such baffles (e.g., folds) being effective to prevent air currents, but not air passage, through said passage. As a result, bacteria present in the air settle and do not reach the food, and the food remains sterile.

In accordance with my invention, the food to be preserved is wrapped in a wrapping having bacterial baffles and then sterilized by suitable means, such as heat (molecular energy), radiant energy, or by other means of sterilization known to the art and suitable for the particular food and wrapping material.

If desired, the food may be wrapped first in an absorbent paper to take up excess oils, etc. Such absorbent paper is porous and may transmit bacteria. The outer wrapping is a paper or other material which will not transmit bacteria transversely through the paper; such a wrapping may be referred to as "bacteria-proof." An example of a suitable "bacteria-proof" paper is an oil-resistant paper, such as vegetable parchment paper. Particularly useful vegetable parchment papers are those commercially available under the trade names "Patapar Vegetable Parchment 27" and "Patapar Vegetable Parchment 21."

Figure 1:
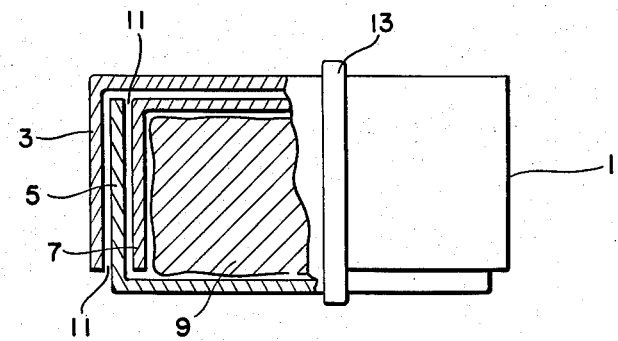
Figure 1 is a diagrammatic, exaggerated, partially cut away, side elevation of one embodiment of a sterile food package prepared in accordance with this invention.

Referring to the drawing, Fig. 1 illustrates a partially cut away baffle-wrapped package 1 wherein a sterile article of food 9 is positioned within three open cup-shaped elements 3, 5 and 7, the first and third (3 and 7) of said elements, i.e., alternating elements, open in the same direction and the second (5) of said elements opens in the opposite direction and in covering relation to the first (7) of said elements. The cup-shaped elements are secured together by suitable fastening means 13, such as a tape or cord. The embodiment shown in Fig. 1 is particularly useful where a relatively firm or rigid package is desired. It will be understood that the cup-shaped elements may be square, oblong, or of any other appropriate configuration, and that additional cup-shaped elements may be used, provided that they exhibit the same interrelationship as those in Fig. 1.

Figures 2, 3:
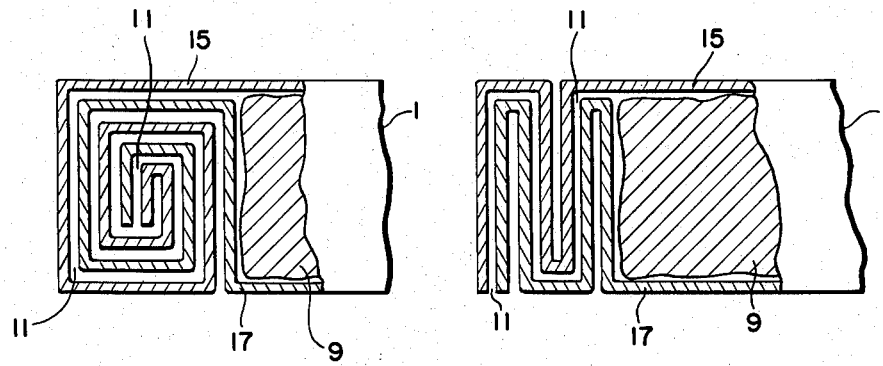
Fig. 2 is a diagrammatic, exaggerated, partially cut away, side elevation of another embodiment of a sterile food package prepared in accordance with this invention.
Fig. 3 is a diagrammatic, exaggerated, partially cut away, side elevation of another embodiment of this invention similar to that of Fig. 2.

Figs. 2 and 3 illustrate two additional embodiments of this invention. A baffle-wrapped package 1 is provided by wrapping a food article 9 between two layers of paper 15 and 17, or other appropriate wrapping material, bringing the ends of the paper together and folding such ends to provide a bacterial baffle. As shown in Fig. 2, the bacterial baffle may be provided by folding the layers of paper 15 and 17 over themselves and flattening the folds so that such folds, viewed endwise, resemble a flat coil. Alternatively, the two layers of paper 15 and 17 may be folded to provide an accordion fold, as shown in Fig. 3.

It will be noted that each of the structures shown in Figs. 1, 2 and 3 provide a passage 11 in open communication with the atmosphere, whereby air may reach the food article 9. Since these passages 11 include at least two bacterial baffles, in the form of folds, bends or angular turns, there is no air turbulence and no air currents, even though air, gases and/or vapors may and do enter and leave such passage 11.

While the embodiments shown in Figs. 2 and 3 have been illustrated as employing one layer of paper on each side of the food, it should be understood that additional wrappings may be used, at least one set of wrappings being folded to provide bacterial baffles, provided that such additional wrappings do not provide hermetic seals. The wrappings in Figs. 2 and 3 may be secured by suitable fastening means, not shown, in a manner similar to that shown in Fig. 1; such fastenings are effective to retain the wrappings in place but do not seal the passages 11 from open communication with the atmosphere. In lieu of using sheets of wrapping, one may use open-ended tubes or bags and fold the open end or ends thereof as described herein to provide a bacterial baffle wrapping. The package cannot be made air tight.

The following example will illustrate the preservation of foods in accordance with this invention but it is intended to be illustrative only and not to be limiting.

*Example*

Six fresh chicken thighs, a package of ground fresh beef, and a large slice of fresh swordfish were purchased. The chicken thighs were boned, the beef was divided into six rectangular patties, and the swordfish was divided into six portions. With the addition of a small quantity of water to each of these foods, they were separately and thoroughly cooked without the addition of any other material, such as salt, spice, condiment, flavor or color. Thorough cooking removed most of the liquified fats from these foods and these fats, along with excess water, were drained off. The cooked foods were allowed to cool to room temperature and were then wrapped separately in vegetable parchment paper. The wrapping was as follows: a 12" square sheet of vegetable parchment paper, resting on a flat surface, was folded along the line midway between two opposite parallel edges of the sheet. A portion of food was placed inside this folded sheet near the center of the fold. The other two free 12" borders were brought together and folded simultaneously along a line parallel to and about one-half inch away from the free border. A second and third similar fold was then made, pressing each fold flat, about one-half inch from the free border. This triple fold viewed at the free borders of the sheet resembled a flat coil, as shown in Fig. 2. The package was then turned over, the folds flattened, and three one-half inch folds were made in the double sheets beginning at the remaining free borders. The outer ends of these two triple folds also resembled flattened coils. With the folds of this single-wrapped package directed downward, the package was wrapped in the same manner in a second sheet of vegetable parchment paper. This procedure was repeated with a third and a fourth sheet. Finally, the four-sheet wrapped package was wrapped in the same manner in aluminum foil and each package marked for identification. The final wrapped packages were placed in an oven which had been pre-heated to 250° F., and kept in the oven at that temperature for 90 minutes. The packages were then removed from the oven and allowed to cool, after which they were kept at room temperature. At intervals thereafter of 13, 20 and 27 days, a single package of each kind of food was opened and inspected. A bacterial culture test of the contents of each package was made, the culturing being made at 36° C. All of the foods were found to be free of spoilage and free of bacteria. They were completely edible. A part of the contents of each of the opened packages was stroked with a glass rod that had previously been rubbed on some decomposing meat. Decomposition of the contents of the opened packages so contaminated by the rod appeared within three days, clearly indicating that the contents of each package was susceptible to bacterial spoilage.

The above example demonstrates that the process of preservation described herein is effective to preserve foods in sterile condition for extended periods of time, even though such foods are in open communication with atmospheric air which contains bacteria.

This invention is applicable to preserve foods against bacteria, fungi, yeasts, spores, protozoa, etc.

The wrapper may be of any material which does not unfavorably affect the food contained therein (as by imparting an undesirable taste), which will not allow bacteria to pass transversely through it, and which will permit conduction or passage through it of molecular or radiant energy used for sterilization. In addition to paper, use is contemplated of materials such as cellulose, plastics, metal foils, plastic felt, wax-coated or plastic-coated paper or foil, etc., which possess such properties. Thus, thin grades of aluminum foil may have microscopic holes through which bacteria may travel but heavy grades of aluminum foil free of such microscopic holes may be used. Use of aluminum foil with certain foods may be undesirable, e.g., with certain meats, in view of the fact that meat juices may attack aluminum. Plastics which adhere to themselves are not suitable, since they would tend to form hermetic seals.

The number of baffles necessary in any given situation will vary, with more baffles being required where there is free fat or liquid, and with as few as two baffles being effective where there is no free liquid. This is due to the fact that such free liquid could enter the passage 11 and effect the passage of any bacteria precipitated in the baffles.

While the sterilization and bacterial baffles are effective to protect the sterilized food from bacterial attack, such food is still subject to changes which are not induced by bacteria, such as oxidative changes or flavor losses. For this reason, it may be desirable in some instances to store the food, preserved in accordance with this invention, under refrigeration. It should be noted that, in contrast to conventional preservation by freezing, the food preserved in accordance with this invention will not be subject to bacterial attack upon thawing, as there are no latent bacteria present as in conventional freezing.

As noted above, the bacterial baffles are effective to protect the sterilized food from bacterial attack, but the food is still subject to chemical changes, such as by oxidation with air passing through the bacterial baffles. If food preserved by the above procedure is stored at low temperatures, e.g., under refrigeration or by freezing passage of air through the bacterial baffles will be substantially reduced and oxidative changes minimized. The foods wrapped and already sterilized in accordance with this invention also may be protected from attack by oxygen by substantially closing the passage 11 which permits air to enter and leave, e.g., by simply flattening the folds which provide the bacterial baffles, e.g., the folds illustrated in Figs. 2 and 3. If the wrapping is composed of a plastic or metallic foil which is deformable by pressure, the passage 11 may be substantially closed by simple pressure. While the resulting package is not hermetically sealed, the contents are sterile and remain sterile, and possible oxidative changes are minimized, if not substantially completely avoided. It should be understood that this further step is unnecessary for many products which may be sterilized in accordance with this invention. In some instances, however, longer shelf life is desirable and the closing of the bacterial baffles in this manner to minimize contact with oxygen will give a substantially longer shelf life without resort to procedures such as freezing or refrigeration.

It should be noted that this invention is applicable to the preservation of uncooked as well as partially or completely cooked foods, provided that they may be sterilized and are wrapped in the manner described. Sterilization of foods in accordance with this invention avoids the use of the high temperatures and pressures for extended periods which are necessary in canning or other hermetic sealing procedures for preservation of foods. Such drastic conditions, with very few exceptions, give rise to deteriorating changes in the appearance, flavor, palatability, and nutritional values of the food being preserved, but such undesirable changes in the quality of the food are minimized, or substantially avoided by this invention.

The preservation of foods in accordance with this invention is simple and economical. It is particularly useful for preserving foods which must be taken into areas lacking in refrigeration or other methods of protecting foods, as in remote areas and in times of catastrophe and emergency. While the invention has been illustrated in connection with foods, it is also useful in the preservation in sterile condition of medicines, medical supplies, bandages, and other materials which may be sterilized.

Since certain changes may be made in the above processes and products without departing from the scope of the invention herein involved, it is intended that all matter contained in the above description or shown in the accompanying drawings shall be interpreted as illustrative and not in a limiting sense.

What is claimed is:

1. The process of preserving, without hermetic sealing, substances subject to bacterial attack, comprising wrapping said substance subject to bacterial attack in a wrapper, said wrapper including at least one passage openly communicating between said substance and the atmosphere, said passage including a plurality of bacterial baffles which permit air to enter and leave but which prevent air currents, said baffles being effective to prevent the passage of bacteria to said substance, and sterilizing said wrapped substance.

2. The process as defined in claim 1, wherein said wrapper is formed by wrapping said substance in at least one thickness of bacteria-proof paper, bringing opposite edges of said paper together and forming a plurality of folds therein to provide said baffles against the transmission of bacteria, said wrapping and folding being so effected as to provide said open passage.

3. The process as defined in claim 1, wherein said wrapping includes at least three substantially cup-shaped, open elements, at least the first and third of said elements open in the same direction and at least the second of said elements opens in the opposite direction and in covering relation to said first element.

4. The process as defined in claim 1, including the step of closing said passage after said wrapped substance has been sterilized, thereby substantially preventing the flow of air through said passage.

References Cited in the file of this patent

UNITED STATES PATENTS

| | | |
|---|---|---|
| 834,474 | Jackson | Oct. 30, 1906 |
| 1,037,218 | Dirnberger | Sept. 3, 1912 |
| 2,380,134 | Waters | July 10, 1945 |
| 2,511,987 | Mrak et al. | June 20, 1950 |
| 2,609,301 | Lindsey | Sept. 2, 1952 |
| 2,632,723 | Bennett | Mar. 24, 1953 |
| 2,640,779 | George | June 2, 1953 |
| 2,721,941 | McMaster et al. | Oct. 25, 1955 |